US008260728B1

(12) United States Patent
Walsh et al.

(10) Patent No.: US 8,260,728 B1
(45) Date of Patent: Sep. 4, 2012

(54) SYSTEM AND METHOD FOR INFLUENCING BEHAVIOR IN A DISTRIBUTED VIRTUAL ENVIRONMENT

(75) Inventors: Richard J. Walsh, Raleigh, NC (US); James Evans, Apex, NC (US); Kunal Kandekar, Morrisville, NC (US); Alfredo C. Issa, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 935 days.

(21) Appl. No.: 12/333,773

(22) Filed: Dec. 12, 2008

(51) Int. Cl.
*G06N 5/00* (2006.01)
(52) U.S. Cl. ............................................. 706/12; 706/45
(58) Field of Classification Search .................... 706/12, 706/45
See application file for complete search history.

(56) References Cited

U.S. PATENT DOCUMENTS

| 5,940,504 | A | 8/1999 | Griswold |
| 5,956,038 | A | 9/1999 | Rekimoto |
| 6,285,380 | B1 | 9/2001 | Perlin et al. |
| 6,499,035 | B1 | 12/2002 | Sobeski |
| 6,577,328 | B2 | 6/2003 | Matsuda et al. |
| 6,912,565 | B1 | 6/2005 | Powers et al. |
| 7,814,154 | B1 | 10/2010 | Kandekar et al. |
| 7,831,707 | B2 | 11/2010 | Bardsley |
| 2003/0014423 | A1 | 1/2003 | Chuah et al. |
| 2003/0115132 | A1 | 6/2003 | Iggland |
| 2003/0177187 | A1 | 9/2003 | Levine et al. |
| 2005/0052994 | A1 | 3/2005 | Lee |
| 2006/0095763 | A1 | 5/2006 | Iyengar et al. |
| 2007/0288598 | A1 | 12/2007 | Edeker et al. |
| 2008/0090659 | A1 | 4/2008 | Aguilar et al. |

FOREIGN PATENT DOCUMENTS

| WO | WO 98/47091 A1 | 4/1998 |
| WO | WO 00/42555 A1 | 1/2000 |
| WO | WO 00/72169 A1 | 5/2000 |
| WO | WO 03/081447 A1 | 10/2003 |
| WO | WO 2007/011752 A2 | 1/2007 |

OTHER PUBLICATIONS

Kazem, et al., A Visibility-Driven Approach to Managing Interest in Distributed Simulations with Dynamic Load Balancing, DS-RT '07 Proceedings of the 11th IEEE International Symposium on Distributed Simulation and Real-Time Applications, IEEE Computer Society Washington, DC, USA, Nov. 19, 2007, pp. 31-38.*
Bjorn Knutsson et al., "Peer-to-Peer Support for Massively Multiplayer Games," (article), Mar. 2004, 12 pages, In the 23rd Conference of the IEEE Communications Society (INFOCOM '04), Hong Kong, China.
No Author, "Congestion Avoidance Overview," (guide), date unknown, 14 pages, Cisco IOS Quality of Service Solutions Configuration Guide, http://www.ciscosystems.com/er/US/docs/ios/12_1/qos/configuration/guide/qcdconav.pdf.
No Author, Dive Tutorial, (website), obtained Mar. 19, 2007, 8 pages, http://www.sics.se/dive/manual/tutorial/.

(Continued)

*Primary Examiner* — Wilbert L Starks
(74) *Attorney, Agent, or Firm* — Withrow & Terranova, PLLC

(57) ABSTRACT

A system and method for influencing behavior in a virtual environment. A virtual environment identifies a hotspot of activity that is, or may, cause lag in the virtual environment. An influencing event is determined and is presented into the virtual environment. The influencing event is configured to influence a control entity associated with a virtual object to avoid the hotspot.

15 Claims, 12 Drawing Sheets

OTHER PUBLICATIONS

Chris Gauthierdickey et al., "Event Ordering and Congestion Control for Distributed Multiplayer Games," (article), May 14, 2005, 10 pages.

Dan Power, "What are the best Second Life resources for communications-driven decision support?", (article), Aug. 19, 2007, 5 pages, http://dssresources.com/faq/index.php?action=artikel&id=139.

Geser Hans, "A very real Virtual Society," (article), Apr. 2007, 21 pages, In: Sociology in Switzerland: Towards Cybersociety and Vireal Social Relations, Online Publikationen, Zuerich, http://socio.ch/intcom/t_hgeser18.htm.

No Author, "Surrender—The Sky Is Falling," (article), obtained Jun. 30, 2008, 5 pages, http://stern.aen.walkerart.org/artifacts.html.

Jean-Sebastien Boulanger, "Comparing Interest Management Algorithms for Massively Multiplayer Games," (article), Oct. 30-31, 2006, Proceedings of 5th ACM SIGCOMM Workshop on Network and System Support for Games, Singapore.

Jouni Smed et al., "A Review on Networking and Multiplayer Computer Games," (article), Apr. 2002, pp. 30, Technical Report No. 454, Turku Centre for Computer Science.

No Author, Main Page—Solipsis, (website), obtained Feb. 6, 2007, 2 pages, http://solipsis.netofpeers.net/wiki2/index.php/Main_Page.

No Author, Microsoft masthead frame with global toolbar, (website), obtained Oct. 10, 2007, 3 pages, http://www.microsoft.com/resources/documentation/windows/xp/all/proddocs/en-us/sag_liceconcepts_401.mspx?mfr=true.

Mojtaba Hosseini et al., "Visibility-based Interest Management in Collaborative Virtual Environments," (article), Sep. 30-Oct. 2, 2002, pp. 143-144, Proceedings of the 4th international conference on Collaborative virtual environments, Bonn, Germany.

No Author, "Multiverse Technology: An Overview," (article), 2005, 12 pages, http://www.multiverse.net/platform/whitepapers/mv_overview_pdf.

No Author, Public-key cryptography—Wikipedia, (website), obtained Mar. 19, 2007, 12 pages, http://en.wikipedia.org/wiki/Public-key_cryptography.

Shun-Yun Hu et al., "Scalable Peer-to-Peer Networked Virtual Environment," (article), Aug. 2004, pp. 129-133, In Proc. 3rd ACM SIGCOMM 2004 workshops on NetGames '04.

No Author, Solipsis—Wikipedia, (website), obtained Mar. 19, 2007, 4 pages, http://en.wikipedia.org/wiki/Solipsis.

Takuji Iimura et al., "Zoned Federation of Game Servers: a Peer-to-peer Approach to Scalable Multi-player Online Games," (article), Aug. 2004, pp. 116-120, in Proc. 3rd ACM SIGCOMM 2004 workshops on NetGames '04.

No Author, "The final COVEN multi-user VR platform—D1.4a The COVEN DIVE platform," (article), Aug. 30, 1998, 49 pages, http://coven.lancs.ac.uk/4/deliverables/del14a.pdf.

No Author, Uni-verse Home, (website), obtained Mar. 19, 2007, 4 pages, http://www.uni-verse.org/Uni-verse-Home.72.0.html.

No Author, Uni-verse On-line Gaming, (website), obtained Mar. 19, 2007, 3 pages, http://www.uni-verse.org/On-line-Gaming.49.0.html.

David Youd, What is a Digital Signature? An introduction to Digital Signatures, (article), obtained Apr. 5, 2007, 4 pages, http://www.youdzone.com/signature.html.

* cited by examiner

```
<rule>
    <description>
        Test the number of clients.  Low powered servers should keep this
        around 100 while high powered servers should be around 10,000
    </description>
    <author>
        John Watkins
    </author>
    <update-url>
        http://rules.xxxxxxxxxpoint.com/maxclients
    </update-url>
    <test-function>
        rule_maxClients
    </test-function>
    <code>
        function rule_maxClients(){
            if ( MessageComponent.getNumberOfClients() > 100 )
                    return true;
            else
                    return false;
        }
    </code>
</rule>
```

FIG. 7A

```
       ┌ <rule>
       │    ┌<description>
       │ 92┤    Test general CPU utilization
       │    └</description>
       │    ┌<author>
       │ 94┤    John Watkins
       │    └</author>
       │    ┌<update-url>
       │ 96┤    http://rules.xxxxxxxxxpoint.com/hw_cpu
       │    └</update-url>
    90 ┤    ┌<test-function>
       │ 98┤    rule_hw_cpu
       │    └</test-function>
       │    ┌<code>
       │    │    function rule_hw_cpu(){
       │    │        if ( ServerComponent.getCPUUtil() > 80 )
       │100┤            return true;
       │    │        else
       │    │            return false;
       │    │    }
       │    └</code>
       └ </rule>
```

FIG. 7B

```
<rule>
    <description>
        Monitor number of virtual object interactions with the "Big Ladi" virtual
        object. Too many interactions with Big Ladi causes the environment to
        grind to a halt so we need to monitor this important virtual object. Low powered
        servers are recommended to set this to 50 whereas high powered servers
        are suggested to use 100.
    </description>
    <author>
        John Watkins
    </author>
    <update-url>
        http://rules.xxxxxxxxxpoint.com/bigLadi
    </update-url>
    <test-function>
        rule_bigLadi
    </test-function>
    <initialization-function>
        initialize-Stuff
    </initialization-function>
    <code>
        // a list of Date objects that indicate the times when "Big Ladi" was interacted with
        var List interactionDates = new List();

function initializeStuff() {
            // register callback function with the virtual world model such
            // that interaction events with "Big Ladi" virtual object cause the callback
            // function to be invoked. (The callback function is defined below)
            VirtualWorldModel.registerCallback( "Big Ladi", Event.INTERACTION,
            callback_bigLadi );

// register a callback function with a Timer component such that every
            // minute the callback function is invoked (the callback function is defined
            // below)
            Timer.registerCallback( callback_timer, Time.ONE_MINUTE );
        } function callback_bigLadi() {
            // An interaction with "Big Ladi" occurred, record that it happened by
            // adding a Date object that is the current time to the list.
            interactionDates.add( Date.currentTime() );
        } function callback_timer() {
            // A minute has passed since the rule started or from the last callback_timer
            // invocation. We want the interactionDates list to only contain the Date
            // objects that represent interactions which occurred within the last 10
            // minutes.

Date tenMinutesAgo = Date.currentTime() - ( 10 * Time.ONE_MINUTE );

// loop over the Date objects in the interactionDates list
            foreach ( item: interactionDates ) {
                if ( item.isBefore( tenMinutesAgo ) == true ) {
                    interactionDates.remove( item );
                }
            }
        } function rule_bigLadi() {
            // the current size of the interactionDates is the number of interactions
            // that have occurred in the last 10 minutes
            if ( interactionDates.size() > 100 )
                return true;
            else
                return false;
        }
    </code>
</rule>
```

FIG. 7C

```
<solicitation-request>
    <problem-information>
        <problem-id>
            TooManyClients
        </problem-id>
        </problem-data>
            <problem-datum>
                <name>numberOfExcessClients</name>
                <value>15</value>
            </problem-datum>
            <problem-datum>
                <name>problemDegree</name>
                <value>HIGH</value>
            </problem-datum>
            <problem-datum>
                <name>clientLocationCoordinates</name>
                <value>[15,25]-[16,26]-[14,25]-[14,25]-[14,23],
                       [15,25]-[16,26]-[14,25]-[14,25]-[14,23],
                       [15,25]-[16,26]-[14,25]-[14,25]-[14,23]</value>
            </problem-datum>
            <problem-datum>
                <name>userID</name>
                <value>kilver, rober, faxmonkey, fred, barney, wilma, betty, dino,
                       joe1234, sally, woot, boo, lulu, fuzzy, mutilate</value>
            </problem-datum>
        </problem-data>
    </problem-information>
    <problem-influencing-events>
        <problem-influencing-event>
            <type>VirtualObjectLure</type>
            <virtual-object-reference>
                http://vo.xxxxxxxxxpoint.com/Leprechaun
            </virtual-object-reference>
            <virtual-object-behavior>
                behaviorRunLikeAManiac
            </virtual-object-behavior>
        </problem-influencing-event>
    </problem-influencing-events>
</solicitation-request>
```

FIG. 8

SYSTEM AND METHOD FOR INFLUENCING BEHAVIOR IN A DISTRIBUTED VIRTUAL ENVIRONMENT

FIELD OF THE INVENTION

The present invention relates generally to virtual environments, and particularly to affecting virtual activity in particular areas of the virtual environments.

BACKGROUND OF THE INVENTION

Computer simulations, including video games, that feature a virtual environment are increasingly popular. Such video games typically feature a computer-generated landscape that may represent an actual or imaginary location in a past, present, or future time. Video game players, or users, can create computer-generated characters, referred to as avatars, and control the avatars on the landscape through client software that runs on a processing device. An avatar can typically roam the landscape and interact with other users' avatars and with other virtual objects. Virtual environments are frequently implemented in a distributed computing environment where server software running on certain hosts execute certain aspects of the video game, and client software executing on user devices, such as personal computers, execute other aspects of the video game.

One problem that can arise in a virtual environment is choppy, or time delayed, movement of avatars or other virtual objects in the virtual environment. This phenomenon is sometimes referred to as lag. Lag can occur for any of a variety of different reasons, including when a processing device associated with the virtual environment does not have sufficient processing capability to keep up with the virtual activity occurring in the area, or region, of the virtual environment for which the processing device is responsible. Lag is disruptive in a video game, and can even cause users to terminate their participation in the game.

Many virtual objects gathering in the same area of the virtual environment can lead to lag if the processing device responsible for the area cannot keep up with the virtual environment activity, such as messaging, that is generated from interactions among many virtual objects. Reducing the number of virtual objects in the area and ensuring that other virtual objects do not enter the area can help reduce the virtual environment activity and reduce the messaging activity causing the lag. However, forcing virtual objects to leave or otherwise avoid congested areas can undermine the perception that a user controls their destiny in the virtual environment, and can reduce the enjoyment of participating in the virtual environment game. Consequently, there is a need for a system and method to influence the movement of virtual objects away from congested virtual areas in a virtual environment in a manner that is not disruptive to a user or that does not otherwise detract from the virtual environment experience.

SUMMARY OF THE INVENTION

The present invention relates to a virtual environment provided by a plurality of hosts. Virtual objects roam the virtual environment at the direction of respective control entities, such as humans or processing devices, depending on the type of virtual object. An area associated with a level of virtual activity is identified as a hotspot of virtual activity. An influencing event is presented into the virtual environment to influence a control entity associated with a virtual object currently in the hotspot or moving in a direction toward the hotspot to avoid the hotspot.

The influencing event can be any suitable event in the virtual environment configured to influence the control entity to avoid the hotspot. According to one embodiment of the present invention, the influencing event involves altering a depiction level of a virtual object to alter its appearance in the virtual environment. For example, a virtual object may have a first depiction level that is an aesthetically desirable rendering of an image of the virtual object, such as a green, flourishing tree. The aesthetically desirable depiction level may be presented in the virtual environment while the processing device rendering the image of the virtual object is not computationally challenged. Subsequently, upon identification of a hotspot, a second depiction level may be used for the virtual object that is a less appealing rendering of the image, such as a tree with fewer, brownish leaves. The depiction level may vary depending on the effectiveness of the influencing event or the activity level of the hotspot. If the activity level is very high, a third depiction level showing a dead, stick-like tree may be used. Preferably, control entities that see undesirable or foreboding images will avoid the hotspot and thereby reduce, or at least not further exacerbate, the virtual activity occurring in the hotspot.

According to another embodiment of the present invention, a combination of lure and repellant type influencing events may be used to influence the control entity to avoid a hotspot. For example, upon identification of a hotspot and a determination that an avatar is moving in a direction toward the hotspot, a lure, such as a treasure map providing directions to a hidden reward, may appear and influence the control entity associated with the avatar to move the avatar toward the hidden reward and away from the hotspot. Alternatively, a repellant, such as a large beast that might damage the avatar, may appear in the avatar's path, influencing the control entity to change directions to avoid the beast and, perhaps unknowingly to the control entity, avoid the hotspot.

According to another embodiment of the present invention, the influencing event may involve the use of a reserved virtual object that is generally recognized by control entities familiar with the respective virtual environment as an indicator of a hotspot. For example, undesirable characters, such as a troll, may be presented between a virtual object and a hotspot, and the control entity associated with the virtual object will recognize that the troll is a reserved object configured to influence a control entity to avoid the hotspot. Alternately, relatively static virtual objects, such as a red traffic light, might be presented between the virtual object and the hotspot, and the control entity associated with the virtual object will recognize the red traffic light as a reserved object configured to influence a control entity to avoid the hotspot.

A first host providing a first region having a hotspot may communicate with a second host providing a second region to coordinate movement of virtual objects from the first region to the second region. The first host may communicate with the second host to request permission to influence the movement of a certain number of virtual objects into the second region, and may request help in introducing an influencing event. The second host may grant permission to accept a certain number of virtual objects from the first region and may be able to provide an influencing event that can be presented in the virtual environment. Such coordination between hosts can eliminate a situation where one overloaded host influences virtual objects to move to a region hosted by another overloaded host.

Feedback can be provided that indicates an effectiveness, or success rate, of the influencing event, and the feedback can be recorded and used in subsequent situations to determine which of several influencing events might be most effective for that situation. If, for any particular situation, an influencing event is ineffective, additional influencing events can be presented in the virtual environment to more effectively influence the control entity associated with virtual objects in the area to avoid the hotspot.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 9:
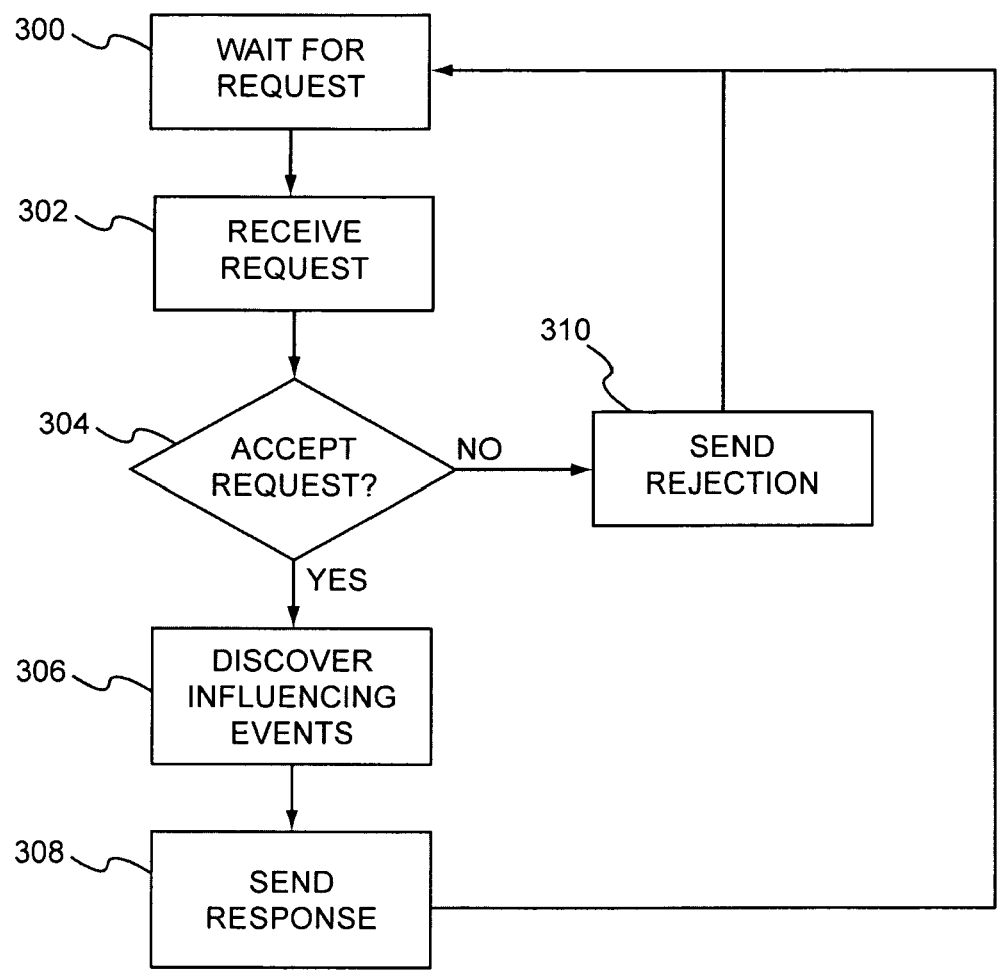
Figure 11:
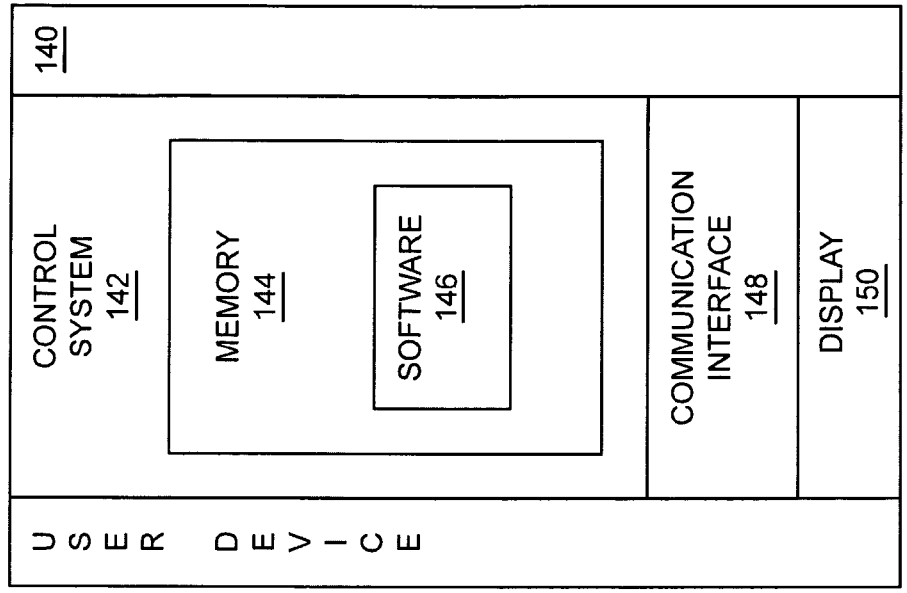
Figure 10:
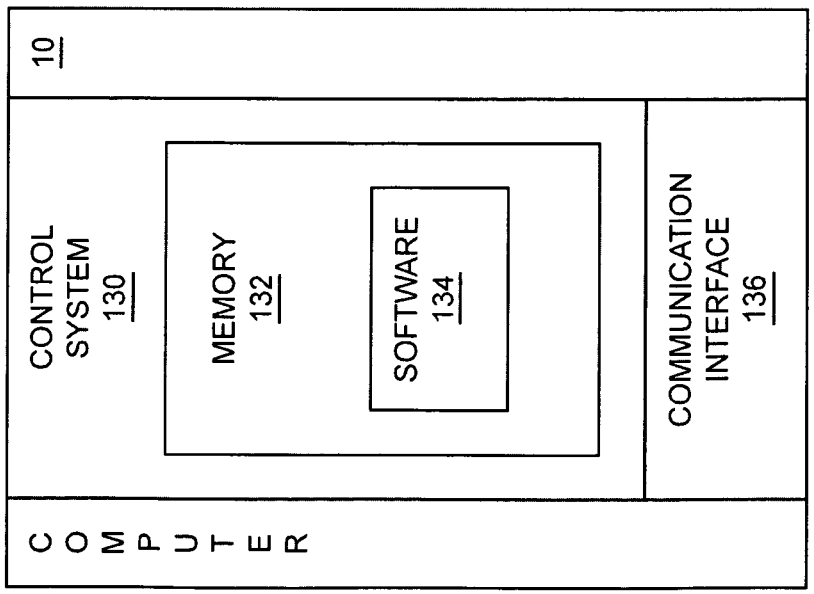

FIGS. 7A, 7B, and 7C are code fragments for identifying hotspots according to one embodiment of the present invention;

FIG. 8 is a code fragment showing a solicitation request for use in a distributed based influencing event;

FIG. 9 is a flow diagram illustrating the use of a distributed based influencing event according to one embodiment of the present invention;

FIG. 10 is a block representation of a host according to one embodiment of the present invention; and FIG. 11 is a block representation of a user device according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Virtual environments enable users to interact with one another irrespective of how great a geographic distance they are from one another. A virtual environment is typically presented and managed by one or more hosts that provide different regions of the virtual environment. As virtual objects, which include both computer-generated objects that are controlled by one or more of the hosts, and avatars, which are representations of users and controlled by the respective user, roam the virtual environment they may interact with one another in various ways. Interactions generally result in message traffic with hosts that provide the region in which the interaction is occurring and computers controlling virtual objects in the area of the interaction. From time to time the message traffic may be so significant that the processing device associated with the host providing the region may become overloaded. An overloaded processing device can result in a time delayed response of virtual objects, or lag, and overall sluggishness of the environment, which is undesirable and may result in users leaving the virtual environment. Lag can be caused by any of a number of factors, including rendering of virtual objects, movement of virtual objects, artificial intelligence processing associated with virtual objects, and the like.

Figure 1:
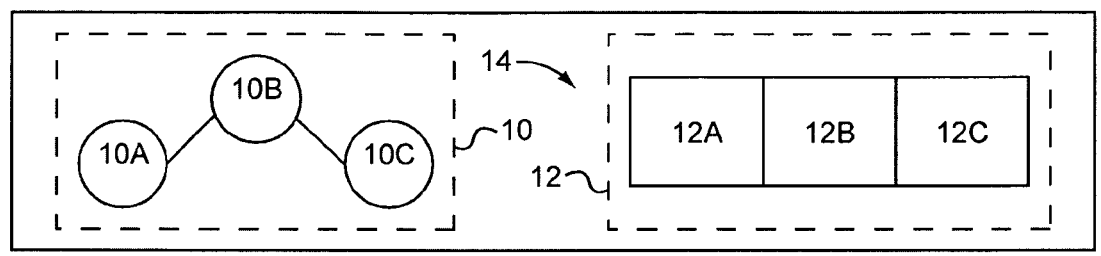
FIG. 1 is a block diagram showing a plurality of hosts and respective regions of a virtual environment hosted by the plurality of hosts.

Among other features, the present invention identifies hotspots of virtual activity that are causing, or may soon cause, lag. The present invention introduces one or more influencing events into the virtual environment configured to influence a control entity associated with a virtual object to avoid the hotspot so that overloading is reduced or prevented. While the invention will be discussed in the context of reducing virtual activity associated with a hotspot, it will be apparent to those skilled in the art that the invention could likewise be used to increase virtual activity in an area of the virtual environment, if desired. Referring now to FIG. 1, a block diagram showing a plurality of hosts 10A, 10B, and 100 and respective regions 12A, 12B, and 12C of a virtual environment 14 is shown. The hosts 10A, 10B, and 100 may be referred to herein singularly as a host 10 or collectively as hosts 10 where the discussion is not related to a specific host 10A, 10B, or 100. The hosts 10 can be provided on any processing device sufficient to handle the functionality described herein. More than one host 10 may be present on a single processing device. The hosts 10 can comprise, for example, a general purpose computer running the Microsoft Windows or Linux operating system. Each host 10A, 10B, and 100 is responsible for hosting a respective region 12A, 12B, and 12C of the virtual environment 14. The hosts 10 can be arranged in a peer-to-peer relationship or in a client-server relationship.

Typically, regions 12A, 12B, and 12C are adjacent and relatively contiguous to one another such that a virtual object roaming the virtual environment 14 is not necessarily aware that the virtual environment 14 has separate regions 12A, 12B, and 12C, although in some virtual environments 14, such as a planetary virtual environment where there are natural and noticeable distinctions between regions 12A, 12B, and 12C, such as between planets, the existence of regions 12A, 12B, and 12C may be apparent. The regions 12A, 12B, and 12C may be referred to herein singularly as a region 12 or collectively as regions 12 where the discussion is not related to a specific region 12A, 12B, or 12C. Entities that exist in the virtual environment 14 are referred to as virtual objects. Virtual objects may range from static entities, such as a rock, with limited or no behavioral characteristics and whose sole purpose is to provide ambience and reality to the virtual environment 14, to dynamic entities that have quite complex behavior determined by artificial intelligence modules that host the virtual environment 14. One type of virtual object is an avatar, which is a representation of a user in the virtual environment 14, and which is controlled by the respective user through the use of client software executing on a user device, such as a computer. The entity that controls a virtual object will be referred to herein as a control entity. Generally, a control entity can be a processing device, when speaking of computer-controlled virtual objects, or can be a human, when speaking of human-controlled virtual objects, such as avatars.

As virtual objects interact with one another in a particular area of the virtual environment 14, message traffic is generated that includes messages identifying the nature of the interaction and the movement of the virtual objects. These messages must be communicated to the respective host 10A, 10B, and 100 hosting the region 12A, 12B, and 12C in which the interaction is occurring, and to any user devices executing client software associated with any avatars in the area of the interaction. The user devices executing client software can comprise any type of processing device suitable for carrying out the functionality described herein and can comprise, for example, a general purpose computer, a special purpose gaming device, such as a Nintendo DS and the like, a cell phone, or a personal digital assistant (PDA). Such user devices will typically have a display screen on which the user can observe the virtual environment 14 as well as their respective avatar, which the user controls via an input on the device such as a keypad, or joystick, or through translated movement of the device via an accelerometer, for example. A single processing device having sufficient processing capability can be both a host 10 hosting a region 12 of the virtual environment 14 and a user device executing client software. Message traffic and computations necessary to execute virtual object simulations can increase as the number of interacting virtual objects in the area increases. The host 10A, 10B, and 100 hosting the area may ultimately be incapable of processing message traffic, handling virtual environment calculations, or otherwise managing the virtual environment 14 in a real-time manner, and this inadequacy can manifest itself in a sluggish environment where virtual objects move slowly, or in a choppy manner. This condition will be referred to herein as lag.

The present invention identifies areas of increased virtual activity that are, or may soon be, experiencing lag. Such areas will be referred to herein as hotspots of virtual activity, or hotspots. Once a hotspot has been identified, potential candidates for influencing are selected. Typically, the candidates will be one or more virtual objects that, if they can be influenced to avoid the hotspot, will preferably reduce the message traffic in the hotspot, or at least will not contribute to the message traffic in the hotspot. As used herein, the term 'avoid' means that if the candidate is already in the hotspot, the candidate may be influenced to leave the hotspot, and if the candidate is not in the hotspot, the candidate may be influenced not to enter the hotspot. After the candidates have been selected, one or more influencing events are introduced into the virtual environment 14. The influencing events are configured to influence a control entity controlling the virtual object to avoid the hotspot. Preferably, the influencing event is such that it appears to be an inherent or natural aspect of the virtual environment 14, and is in the overall tenor of the virtual environment 14, so as not to appear unusual or detract from the overall enjoyment of the virtual environment 14 by the user. While influencing events will be discussed in greater detail below, one example of an influencing event in a medieval virtual environment 14 would be the introduction of a dragon that might harm an avatar, wherein the dragon is introduced into the virtual environment 14 between the avatar and a known hotspot. The dragon is configured to influence the control entity, in this example the user controlling the respective avatar, to change directions to avoid the dragon and, perhaps unknown to the user, thereby avoid a hotspot of virtual activity.

Figure 2:
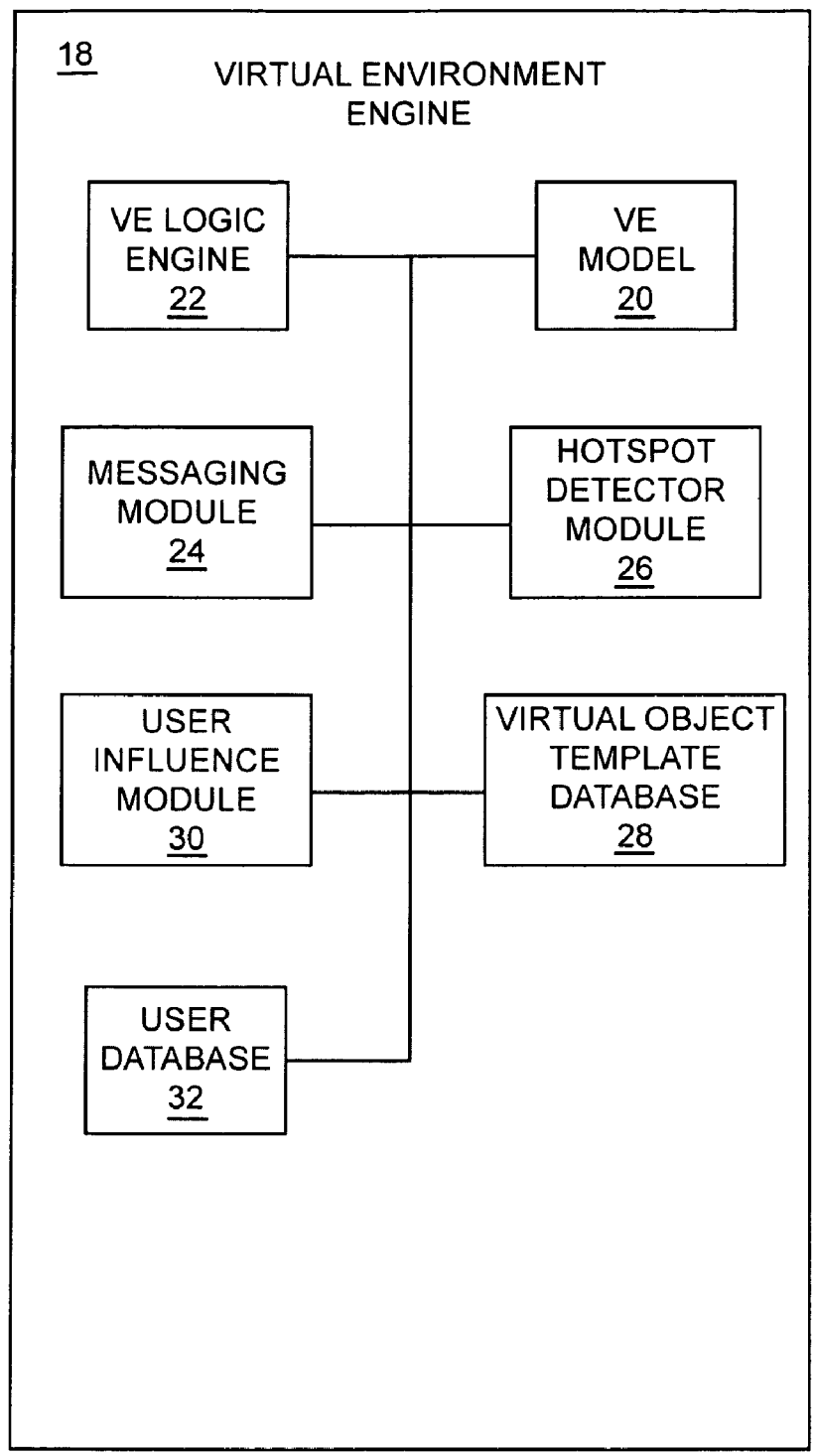
FIG. 2 is a block diagram illustrating modules suitable for executing on the plurality of hosts shown in FIG. 1 for implementing aspects of one embodiment of the present invention.

Referring now to FIG. 2, a block diagram illustrating modules suitable for executing on a processing device for implementing aspects of one embodiment of the present invention is shown. While FIG. 2 shows one way to bifurcate and implement the functionality described herein, the present invention is not limited to this particular method, and the bifurcation of functionality among software modules may be design- or implementation-dependent. Preferably, the present invention is implemented in software, using a programming language such as C, or C++, or any other suitable computer language capable of implementing the functionality described herein. However, all or some of the functionality described herein might be implemented in hardware, such as an application-specific integrated circuit (ASIC) or in firmware depending on the particular device or devices on which the present invention is being implemented.

A virtual environment engine 18 runs on a host 10 and has a plurality of modules suitable for maintaining a region 12 of the virtual environment 14. A virtual environment model 20 maintains instances of virtual object templates and represents the state of the virtual objects in the virtual environment 14. The virtual environment model 20 may be persisted in a central or distributed database or maintained in a memory of the host 10. A virtual environment logic engine 22 executes rules and employs artificial intelligence techniques that enable the virtual environment 14 to simulate reality. The virtual environment logic engine 22 uses information in the virtual environment model 20 to calculate the simulated behavior.

A messaging module 24 provides the infrastructure to communicate with client software and other virtual environment 14 engines distributed across a network. A hotspot detection module 26 monitors internal and external virtual environment 14 message traffic and the virtual environment model 20 to detect hotspots. A virtual object template database 28 can store virtual object templates associated with virtual objects in its region. A virtual object template provides a definition from which individual instances of the respective virtual object in the virtual environment 14 can be generated. A separate virtual object template instance exists for each instance of a virtual object in the virtual environment 14. For example, a 'butterfly' virtual object template instance defines attributes such as size, color, age, and location of a respective butterfly in the virtual environment 14 generated from the 'butterfly' virtual object template. The butterfly virtual object template may also define behavior associated with the butterfly, for example how the butterfly eats, flies, sits, and responds to events that occur in the virtual environment 14. The virtual object template may also include three-dimensional (3D) graphics model information such that a 3D engine can render the virtual object appropriately. The butterfly virtual object template can also include sounds, such as the sounds the butterfly makes when eating or flying. Each instance of a butterfly virtual object template has its own unique state of properties related to a respective butterfly in the virtual environment 14. For example, one butterfly virtual object template instance may indicate that one butterfly in the virtual environment 14 is blue, is located at coordinates 20, 30, of the virtual environment 14, and is two inches in size. Another butterfly virtual object template instance may indicate that another butterfly in the virtual environment 14 is red, located at coordinates 10, 10, and is five inches in size. A virtual object template may also include variables that allow for variations. For example, a virtual object template property may have several options, such as: 'color {red, green, blue}' or 'size {1 inch to 20 inches}.'

The virtual object template database 28 may be a complete or partial listing of all virtual object templates available in the entire virtual environment 14. The virtual object templates may be obtained from a central server such as a virtual environment authority, other hosts 10 in a distributed virtual environment 14, or a third-party system. A user influence module 30 can monitor and analyze performance metrics associated with the virtual environment 14, such as central processing unit (CPU) utilization, memory utilization, or other resource utilization to detect hotspots. The user influence module 30 can construct and facilitate the execution of influencing events that are configured to influence control entities to avoid hotspots. The user influence module 30 can also use the messaging module 24 to coordinate influencing events with other hosts 10 in the virtual environment 14. A user database 32 stores user account information such as name, address, subscription level, and the like, and enables authentication of a user who desires to participate in the virtual environment 14. The user database 32 can be a complete or partial copy of a database that is centralized on a particular host 10, distributed across a plurality of hosts 10, or provided by a third party service.

Figure 3:
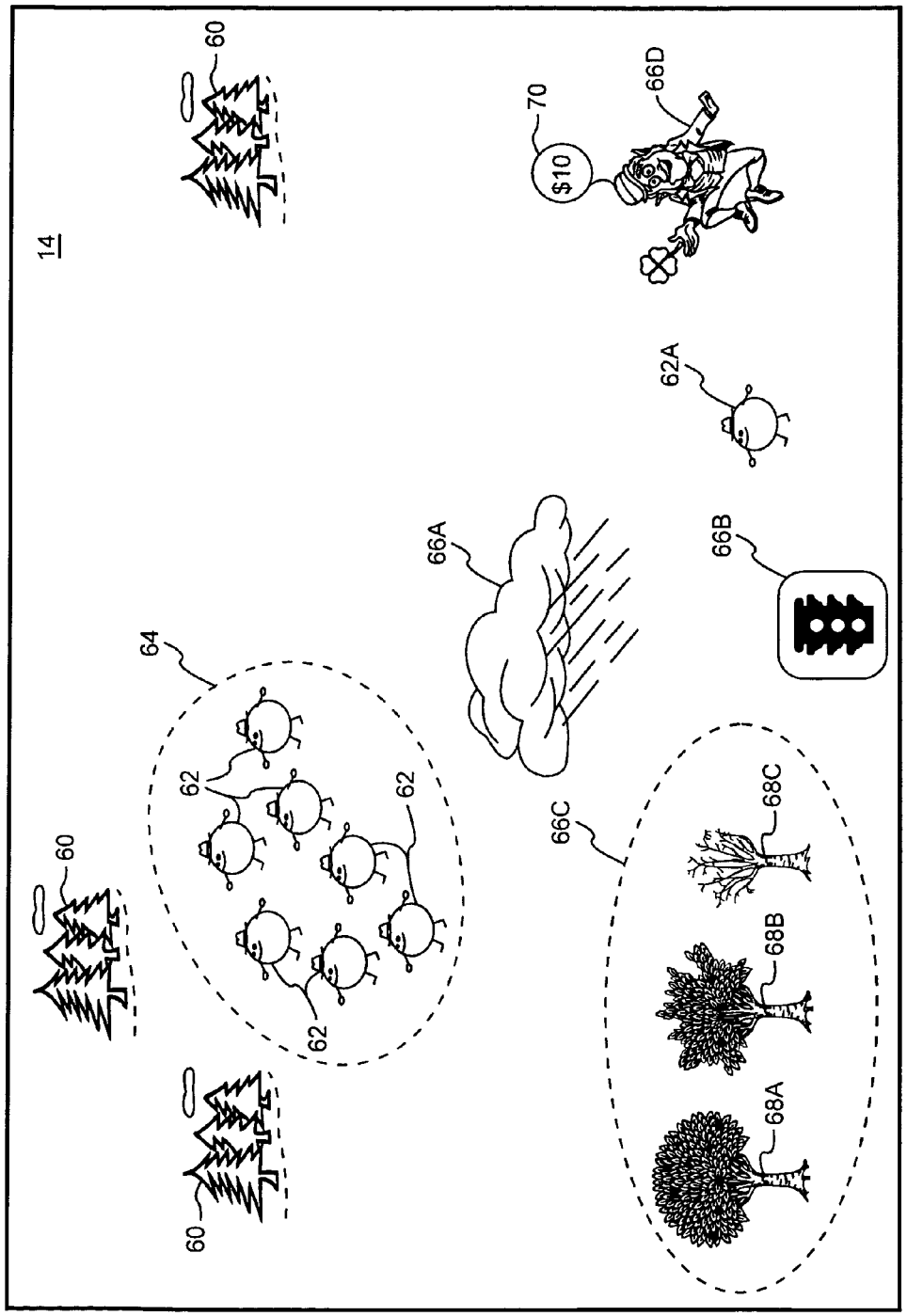
FIG. 3 shows a variety of influencing events and virtual objects in the virtual environment according to one embodiment of the present invention.
Figure 4:
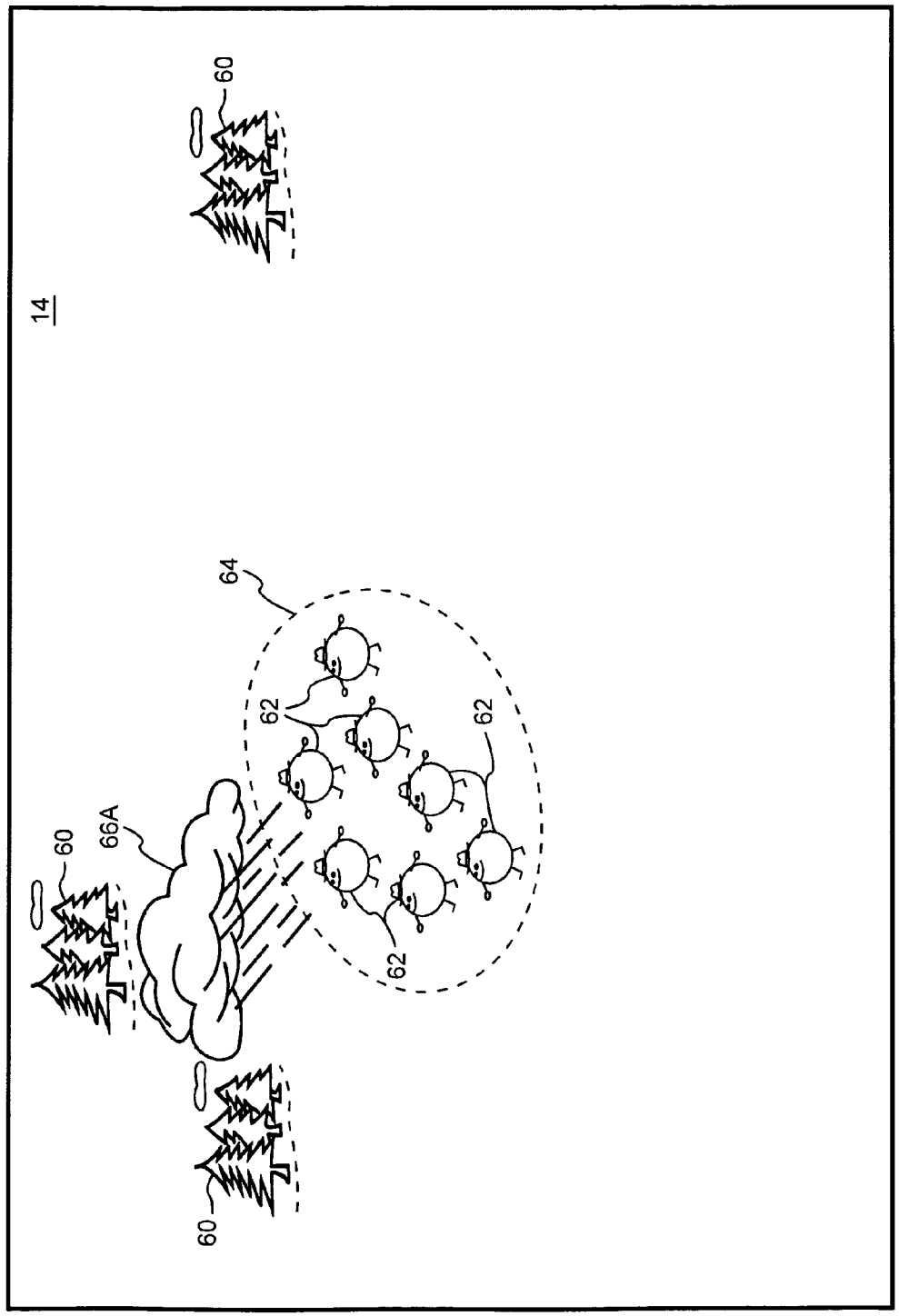
FIG. 4 shows a group influencing event and virtual objects in the virtual environment according to another embodiment of the present invention.
Figure 5:
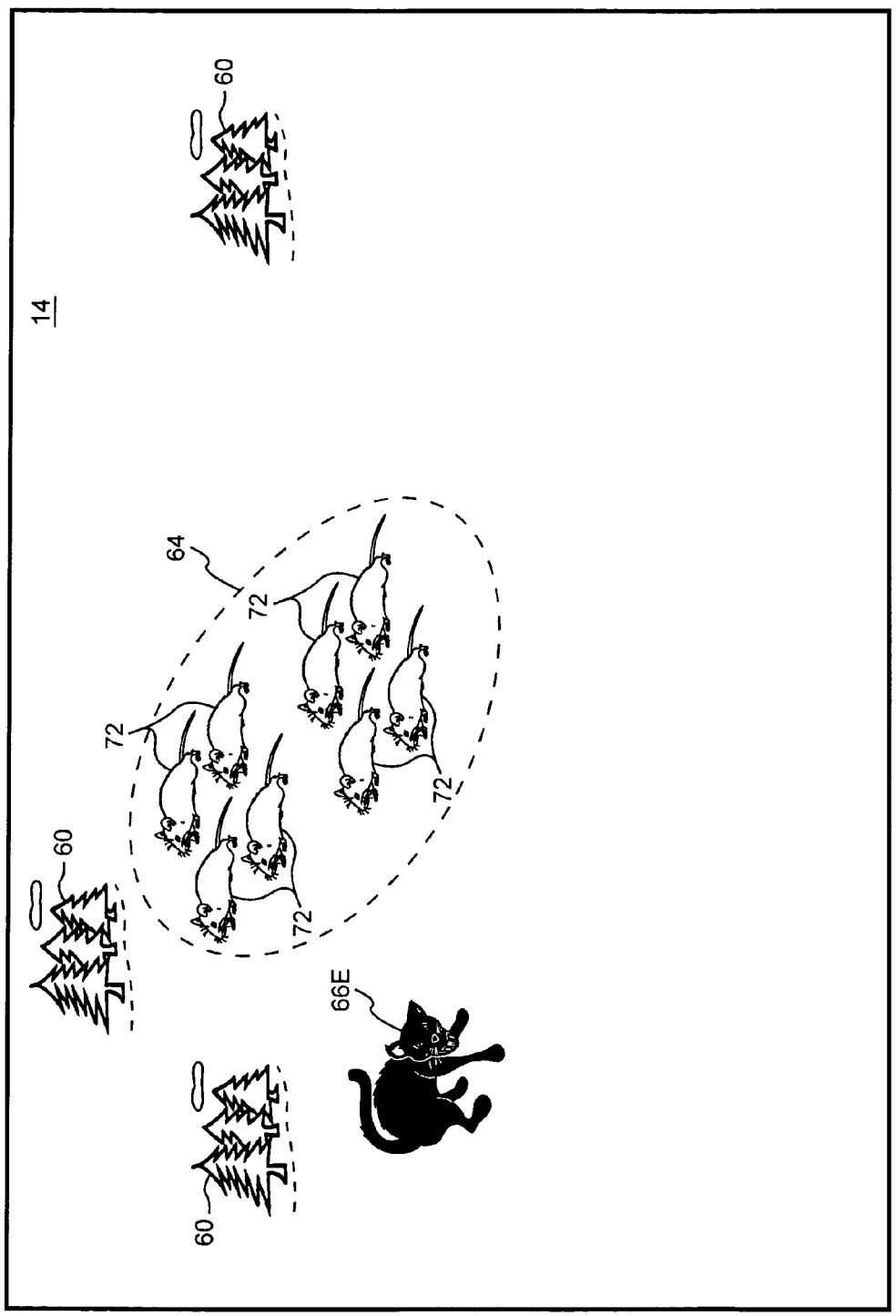
FIG. 5 shows a group influencing event and virtual objects in the virtual environment, wherein a control entity is a processing device.

FIGS. 3-5 illustrate various types of influencing events configured to influence a control entity of a virtual object to avoid a hotspot. Referring now to FIG. 3, a variety of influencing events and virtual objects in a virtual environment 14 according to one embodiment of the present invention are shown. A plurality of tree virtual objects 60 provide ornamentation and ambiance to the virtual environment 14. An avatar 62A is moving generally in a direction toward a hotspot 64 which has been identified based on a level of message traffic generated by virtue of interactions between a plurality of avatars 62. A 'repellant' type influencing event 66A may be introduced into the virtual environment 14. The repellant type influencing event 66A may comprise a virtual force, such as a strong wind, that makes movement of the avatar 62A toward the hotspot 64 difficult. For example, the repellant type influencing event 66A may include a cloud and a howling wind sound, and may require many more movements by the control entity to move the avatar 62A a given distance toward the hotspot 64 than was required prior to introduction of the repellant type influencing event 66A. Preferably, the control entity tires of the effort required and moves the avatar 62A in a different direction, thereby avoiding the hotspot 64. Such a virtual force could comprise any type of force preferably consistent with the respective virtual environment, such as a mudslide, an erupting volcano, a flood, and the like. Alternatively, a 'reserved object' type influencing event 66B may be presented in the virtual environment 14. The reserved object type influencing event 66B may comprise a common symbol such as a red traffic light or a stop sign. The control entity may be aware that the appearance of a red traffic light indicates the existence of a hotspot, such as the hotspot 64, and may then move the avatar 62A in a direction away from the reserved object influencing event 66B, thereby avoiding the hotspot 64.

A depiction level type influencing event 66C may be presented into the virtual environment 14. While FIG. 3 shows the concurrent display of three depiction levels 68A, 68B, and 68C, this is for purposes of illustration and convenience, and it should be understood that only one depiction level of a virtual object would typically be presented in the virtual environment 14 at one time. Initially, a depiction level 68A showing a lush, aesthetically appealing virtual object tree might be shown. Upon identification of the hotspot 64, depiction level 68B may be used, which shows a less-lush, less appealing virtual object tree with fewer leaves. If the appearance of a less desirable tree is insufficient to influence the control entity associated with the avatar 62A to avoid the hotspot 64, or if the level of virtual activity in hotspot 64 continues to increase, a depiction level 68C may be used, which shows an unhealthy tree with few leaves. Preferably, the control entity associated with the avatar 62A will avoid an undesirable appearing area and seek an environment with a more pleasing appearance, thereby avoiding the hotspot 64.

According to another embodiment of the invention, a virtual object template associated with a virtual object may be modified such that the virtual object is influenced to avoid a hotspot. For example, assume that a plurality of bee virtual objects have congregated in an area of the virtual environment 14 and processing activity associated with the plurality of bee virtual objects results in a hotspot. The virtual object template of the bee virtual objects may specify a certain level of attraction to one or more types of flowers. The level of attraction may comprise a numeric value ranging from 1-10, with 1 indicating no attraction to the type of flower and 10 indicating that the bee virtual objects can not resist the type of flower. If the reason for the congregation of the bee virtual objects is the existence of a flower type that the bee virtual objects cannot resist, the virtual object template for the bee virtual objects can be altered, either temporarily or permanently, to indicate a lower level of attraction to that type of flower. The bee virtual objects, no longer attracted to the flowers, preferably leave the hotspot seeking flowers to which they are attracted.

According to another embodiment of the invention, one or more processing functions associated with the bee virtual objects can be altered to influence the bee virtual objects to leave the hotspot. For example, a processing function responsible for apprising the bee virtual objects of the virtual objects in the vicinity of the bee virtual objects may filter, or remove, any information relating to flower virtual objects. In essence, although the flower virtual objects exist in the virtual environment 14, they are not seen by the bee virtual objects, who preferably leave the hotspot in search of flowers or other virtual objects they have an interest in.

According to another embodiment of the present invention, a lure type influencing event 66D, such as a leprechaun having an associated reward 70, may be presented into the virtual environment 14. The control entity associated with the avatar 62A may see the lure type influencing event 66D and desire to capture the leprechaun and obtain the reward 70. The control entity moves the avatar 62A toward the lure type influencing event 66D, thereby avoiding the hotspot 64.

The influencing events 66A, 66B, 66C, and 66D may be presented serially or concurrently. For example, the virtual environment 14 may initially present the repellant type influencing event 66A, and upon determination that the control entity has not been influenced to avoid the hotspot 64, the virtual environment 14 may introduce the lure type influencing event 66D while keeping the repellant type influencing event 66A present in the virtual environment 14. Alternatively, the virtual environment 14 may present both the repellant type influencing event 66A and the lure type influencing event 66D simultaneously. Thus, one or more influencing events 66A, 66B, 66C, and 66D may be presented at the same time in the virtual environment 14 to influence the control entity. Influencing events 66A, 66B, 66C, and 66D may also be altered to increase the effectiveness of their influence. For example, a wind speed of the repellant type influencing event 66A may be increased to further inhibit the movement of the avatar 62A toward the hotspot 64. As another example, the reward 70 associated with the lure type influencing event 66D may be increased if the initial reward 70 was insufficient to influence the control entity to attempt to capture the leprechaun and thereby avoid the hotspot 64.

FIG. 4 shows a repellant type influencing event 66A and a plurality of avatars 62 in the virtual environment 14 according to another embodiment of the present invention. In this embodiment, the repellant type influencing event 66A is presented in the virtual environment 14 such that it influences a number of control entities associated with the plurality of avatars 62 that are contributing to the message traffic that created the hotspot 64. The repellant type influencing event 66A may comprise a strong and erratic wind, such that the control entities find it difficult to maintain the close proximity of their respective avatars and are influenced to move their respective avatars 62 away from the hotspot 64, thereby decreasing the message traffic and eliminating the hotspot 64.

FIG. 5 shows a repellant type influencing event 66E and a plurality of virtual objects 72 in a hotspot 64 in the virtual environment 14, wherein the control entities of the virtual objects 72 are one or more processing devices. The virtual objects 72 in the hotspot 64 comprise mice virtual objects, and are illustrated to show that computer-controlled virtual objects generate message traffic that can result in a hotspot, such as the hotspot 64, and lag. The repellant type influencing event 66E in this example is a cat. Upon determining the close proximity of a deadly predator to their respective virtual objects, the control entities will preferably move their respective virtual objects away from the cat and thereby eliminate the hotspot 64. While some of the virtual objects 72 may disperse, others may be consumed by the cat. The cat may continue to consume virtual objects 72 until the cat is satiated. The repellant type influencing event 66E may also have an associated time duration, such that after a period of time, the cat is removed from the virtual environment 14.

Figure 6:
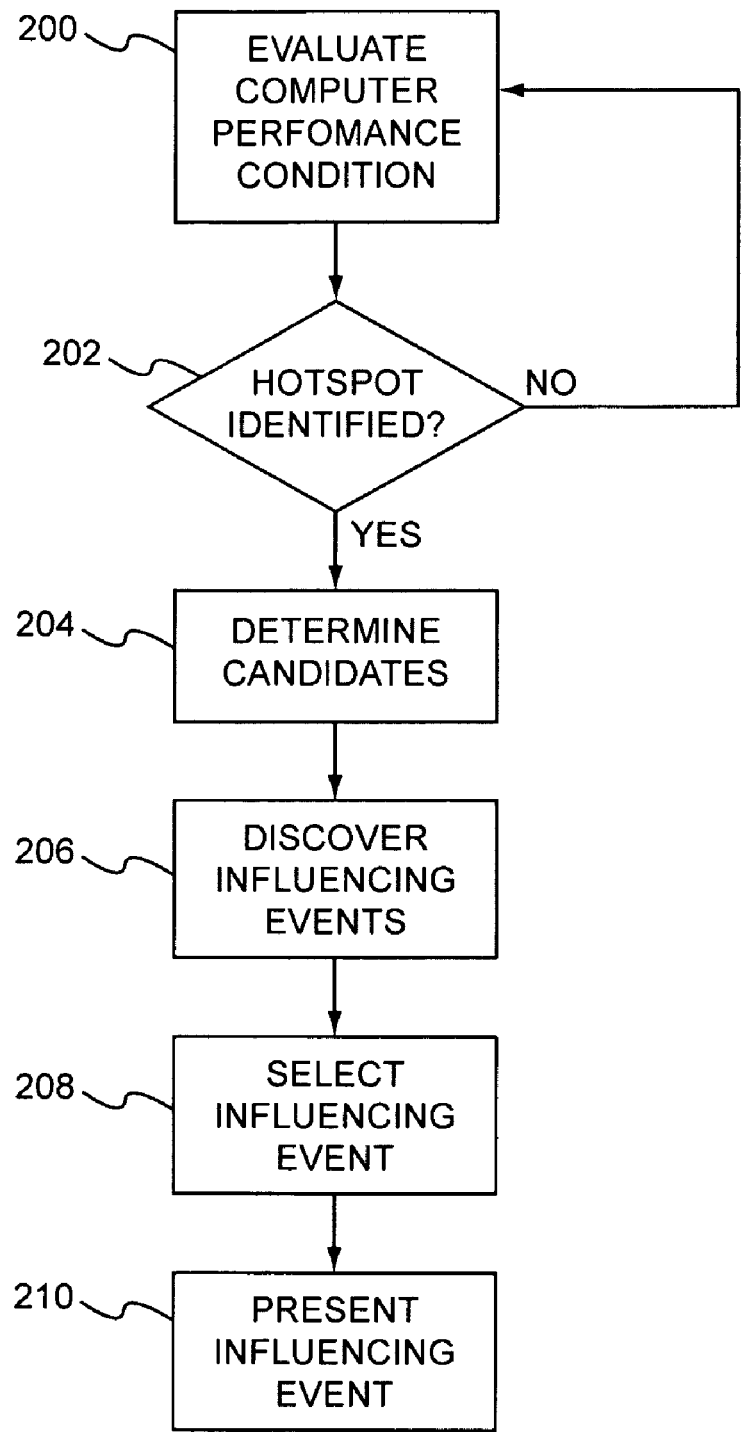
FIG. 6 is a flow diagram illustrating a process that can be performed by a user influence module to identify hotspots and present one or more influencing events into the virtual environment according to one embodiment of the present invention.

FIG. 6 is a flow diagram illustrating a process that can be performed by the user influence module 30 to identify hotspots and present one or more influencing events into the virtual environment 14 according to one embodiment of the present invention. It will be assumed for purposes of discussion that the virtual environment 14 is being executed in a client-server architecture, and that the user influence module 30 is executing on a particular server, such as a host 10, that is hosting a respective region 12 of the virtual environment 14. The user influence module 30 evaluates various performance attributes of the host 10 to determine whether any performance issues exist (step 200). The particular attributes used may differ depending on the particular host 10 or virtual environment 14. The particular attributes can include evaluation of the virtual environment performance that is based on criteria that are specific to a respective virtual environment 14, such as an amount of lag detected, a number of messages per second, specific message types (e.g., chat messages, movement messages, etc.), a number of virtual object interactions, and the like. The performance attributes that are analyzed may be stored in a user configurable data file or dynamically loaded from a database, from either a local or a remote location. In a preferred embodiment, the performance attributes to be analyzed and acted upon are defined as rules and created in an Extensible Markup Language (XML) format that includes a script or formal language such as C, Java, Python, or the like. The rules may be executed in a protected sandbox that provides secure access to other modules in the virtual environment engine 18, such as the hotspot detection module 26, the messaging module 24, and the virtual environment model 20. The hotspot detection module 26 may, for example, provide information identifying virtual objects that are producing a large number of messages. The messaging module 24 may provide information such as the number of active avatars and statistics regarding their message production or consumption.

If a hotspot has been identified (step 202), candidates that can be influenced are determined (step 204). Candidates will typically comprise one or more virtual objects controlled by humans, such as an avatar, or one or more virtual objects controlled by a processing device. The candidates may be determined as a function of the virtual objects producing the highest number of messages, or may be prioritized based on criteria such as how long the virtual object has been connected to the host 10, or by any other criteria deemed appropriate by the virtual environment 14. For example, where the hotspot is a particular area within the region 12, the candidates may be those virtual objects that are contributing most heavily to the message traffic. Alternately, where the hotspot is determined to be the entire region 12, it may be more appropriate to prioritize candidates as a function of connection time, for example.

After one or more candidates have been determined, the user influence module 30 determines which influencing event to present in the virtual environment 14 (step 206). The specific influencing event may be determined in a number of different ways, including by configuration parameters defined by an administrator of the respective host 10, as a function of the respective candidate, or by seeking recommendations from a local or distributed database containing influencing events for specific virtual objects. For example, if the candidates are a plurality of mice, then a repellant type influencing event comprising one or more cats may be appropriate. If the candidate is an avatar that is short on virtual environment money, a lure type influencing event that promises the reward of money may be appropriate. The candidate may have an associated template that indicates what type of influencing event would most likely influence the control entity to avoid the hotspot. For example, a template associated with a zebra virtual object may indicate that a 'flee' event is triggered by a loud noise. The user influence module 30 may then query the virtual object template database 28 to determine if any virtual objects are capable of producing loud noises. If one is located, then the user influence module 30 may present the virtual object into the virtual environment 14 in close proximity to the zebra virtual object. Where the virtual object is an avatar, the user influence module 30 may query a personal profile of the control entity associated with the avatar to determine whether information exists that may be helpful in determining an influencing event. The information in the personal profile may be provided by the user during a registration process, may be obtained from a third party, or may be system provided upon determining various likes or dislikes of the user. For example, if the personal profile discloses that the user is interested in objects that fly, the user influence module 30 may introduce a helicopter virtual object into the virtual environment 14 to influence the user to move the avatar in a direction toward the helicopter. While the process described in steps 204-206 has been described as being performed by the user influence module 30 associated with the host 10 on which the hotspot exists, this process could be performed in a distributed manner by a different host 10, or by a third party service adapted to provide influencing events based on certain criteria associated with the hotspot. In such an embodiment, the user influence module 30 may provide the third party service a list of candidates in the hotspot and relevant virtual environment state information, and the third party service may provide an influencing event recommendation or an influencing event object as a function of such information.

A particular influencing event is then selected (step 208). The selection may be as simple as selecting the first influencing event that is discovered for the particular candidate, or may involve an analysis of an historical effectiveness of the influencing event. The particular effectiveness of the selected influencing event may differ depending on the type of influencing event at issue. For example, the effectiveness of a lure type influencing event may be determined by how many candidates were actually lured, the percentage of the candidates that were lured, how long it took for the lure to begin, how long the lure lasted, and the like. The user influence module 30 records the appropriate data associated with the candidate while executing the influencing event and analyzes the results during down time of the associated processing device. Alternately, the user influence module 30 can analyze the results in real-time, or on-demand. To select a particular influencing event, the user influence module 30 can group the influencing events by type and sort them according to specific measurements. For example, the influencing events that are lure-based can be grouped together and then sorted by percentage of candidates that were lured, the average length the lure lasted for each candidate, and the average time for a candidate to start following the lure. As another example, repellant type influencing events can be grouped together and sorted by the percentage of candidates that did not come back to the hotspot, the average time the candidate stayed away from the hotspot, and the percentage of candidates that left the hotspot. The user influence module 30 can be configurable to allow an administrator of the respective host 10 to specify the particular data field on which the influencing events can be sorted and the various selection algorithms.

The user influence module 30 preferably uses the influencing event effectiveness measurement data related to the current set of candidates. However, if the user influence module 30 does not have information relating to the particular candidates, the user influence module 30 may use data related to other candidates to select the influencing event. The user influence module 30 may store effectiveness data in a database or a distributed data structure, such as a distributed database. Alternately, the user influence module 30 may store effectiveness data on the particular candidate host, thereby allowing candidates to carry effectiveness data as they traverse various hosts in the virtual environment 14. Alternately, rules used to identify a hotspot may include specified influencing events. For example, a rule may exist that determines, upon a certain CPU utilization, a first depiction level for a particular virtual object, and as the CPU utilization increases, different depiction levels for the virtual object.

After the particular influencing event is selected, it is then presented into the virtual environment 14 (step 210). The user influence module 30 may present an influencing event into the virtual environment 14 immediately, or may delay the presentation of the influencing event based on the severity of the hotspot. For example, where the hotspot has resulted in a significant performance degradation of the host 10, the influencing event may be presented into the virtual environment 14 immediately. Alternatively, when a level of activity of the hotspot has only slightly degraded the performance of the host 10, the influencing event may be entered into the virtual environment 14 after a predetermined delay. Rules that aid in identifying the hotspot may also include information quantifying the severity of the problem. For example, the rule may describe a certain number of messages per minute as a low degree problem, and a higher number of messages per minute as a high degree problem. To aid in monitoring the effectiveness of the influencing event, the user influence module 30 can register a callback with the virtual environment engine 18 to provide information about movements of the candidates. For example, the user influence module 30 can register a callback for events related to the movement of the candidate or state changes of the candidate. Preferably, the user influence module 30 periodically monitors the data provided by the callback to determine whether the influencing events are reducing or eliminating the hotspots. When the user influence module 30 determines that an influencing event is not particularly effective, the user influence module 30 can introduce another influencing event or may alter the existing influencing event to increase its effectiveness at influencing a control entity to avoid the hotspot. For example, if a lure type influencing event is used and the user influence module 30 determines that the lure type influencing event is not in fact luring any candidates, the user influence module 30 may increase a reward associated with the lure.

FIG. 7A is a code fragment of a rule 90 suitable for identifying a hotspot according to one embodiment of the present invention. A description field 92 may provide a human readable explanation of the purpose of the rule 90. An author field 94 may identify the author of the rule 90. An update field 96 may provide an address to ensure the most current rule 90 is being utilized. A function field 98 contains the identification of the function that may be invoked to execute the rule 90. A code field 100 contains the actual code that implements the rule 90. In this example, the code field 100 contains code that determines the number of clients connected to a particular host. If the number of clients exceeds the number one hundred (100), then the rule 90 returns the value true, otherwise the rule 90 returns the value false.

FIG. 7B is a code fragment of a rule 90 suitable for identifying a hotspot according to another embodiment of the present invention. The rule 90 contains a description field 92, an author field 94, an update field 96, and a function field 98, each of which serves a similar purpose as described with regard to FIG. 7A. A code field 100 contains code that tests a CPU utilization of the processing device on which the respective host 10 executes. If the CPU utilization is greater than eighty percent (80%), the rule 90 returns the value true, otherwise the rule 90 returns the value false.

FIG. 7C is a code fragment of a rule 90 suitable for identifying a hotspot according to yet another embodiment of the present invention. The rule 90 contains a description field 92, an author field 94, an update field 96, and a function field 98 as described previously with respect to FIGS. 7A and 7B. The code fragment shown in FIG. 7C relates to a particular virtual object in the virtual environment 14 referred to as BIG LADI. The BIG LADI virtual object may be a popular virtual object in the virtual environment 14 and, consequently, may be frequently involved in interacting with many virtual objects at one time. A code field 100 includes code to test the number of interactions that occurred between BIG LADI and other virtual objects within a predetermined period of time. Too many interactions between the BIG LADI virtual object and other virtual objects in the virtual environment 14 may indicate a hotspot.

According to one embodiment of the present invention, a distributed-based influencing event may be utilized to influence control entities to avoid a hotspot. For example, a host 10A that has identified a hotspot in a region 12A may desire to coordinate with a host 10B hosting a region 12B to resolve the situation. Such collaboration may allow the host 10A to discover influencing events the host 10A was not aware of, and to ensure that the host 10B is capable and willing to accept virtual objects that may be influenced to move from the region 12A to the region 12B. The regions associated with collaborating hosts 10 need not be adjacent to one another. For example, in a virtual environment 14 having a futuristic theme involving planets in a galaxy, one host 10 may open a portal, such as a wormhole, that enables a virtual object to travel long distances through the galaxy from one host 10 to another host 10 operating a region in the virtual environment 14 that is far away.

FIG. 8 is a code fragment showing a solicitation request 110 that the host 10A can use to collaborate with the host 10B according to one embodiment of the present invention. The solicitation request 110 can include a problem-information field 112 containing a problem-id field 114 identifying the particular problem, in this example the problem being that the host 10A has too many clients connected to it. A problem-data field 116 can include problem-datum fields 118A, 118B, 118C, and 118D to provide information to the host 10B, such as a number of excess clients on the host 10A, the severity of the problem, the location coordinates of the clients selected by the host 10A, and user names associated with those clients. The solicitation request 110 may include a problem-influencing-events field 120 that contains one or more problem-influencing-event fields 122 that include a proposed influencing event that may be used.

FIG. 9 is a flow diagram illustrating a process that may be used by a host 10 to implement a distributed-based influencing event according to one embodiment of the present invention. The user influence module 30 can use one or more threads to manage and respond to solicitation requests from other hosts 10. The user influence module 30 waits for requests from other hosts (step 300). Upon determination that a request has been received (step 302), the user influence module 30 determines whether it will accept the request (step 304). The user influence module 30 may choose not to accept the request for a variety of reasons, such as if the user influence module 30 is currently overloaded and attempting to present influence events in its region at the time, or the user influence module 30 may be configured to only accept requests from identified hosts 10. If the user influence module 30 rejects the request, a rejection can be sent to the originating sender of the solicitation request (step 310). Assuming that the user influence module 30 accepts the request, the user influence module 30 can determine potential influencing events that may be useful (step 306). Preferably, as described below, the solicitation request 110 contains sufficient information to enable the user influence module 30 to determine an influencing event, but if not, the hosts 10 can exchange additional messages as necessary. A response is constructed and sent to the originating host (step 308). A response may comprise one of several different types of responses. A response can be an approval to implement the proposed influencing event, indicating that the respective host 10 is prepared to accept virtual objects that may be influenced to move to the respective host 10 after the influencing event is presented into the virtual environment 14. Alternately, the response may be a rejection indicating that the respective host 10 is not capable of accepting additional virtual objects from the requesting host 10. Alternately, the response may be a counterproposal indicating that the responding host 10 proposes a different influencing event that can be provided to the requesting host 10 or implemented by the responding host 10, as appropriate.

FIG. 10 is a block representation of a host 10 according to one embodiment of the present invention. The host 10 includes a control system 130 that includes a memory 132 in which software 134 suitable for implementing the functionality described herein resides. A communication interface 136 enables communication between the host 10 and a network (not shown).

FIG. 11 is a block representation of a user device 140 according to one embodiment of the present invention. The user device 140 includes a control system 142 that includes a memory 144 in which software 146 suitable for implementing the functionality described herein resides. A communication interface 148 enables communication between the user device 140 and a network (not shown). A display 150 enables a user to perceive the virtual environment 14 and observe their associated avatar within the virtual environment 14.

Those skilled in the art will recognize improvements and modifications to the preferred embodiments of the present invention. All such improvements and modifications are considered within the scope of the concepts disclosed herein and the claims that follow.

What is claimed is:

1. A method for altering a virtual environment comprising:
providing a virtual environment comprising a first virtual object;
identifying a hotspot of virtual activity in the virtual environment;
presenting an influencing event configured to influence a control entity associated with the first virtual object to avoid the hotspot in the virtual environment, wherein the influencing event comprises a lure; and
receiving feedback from the virtual environment regarding a success of the lure; and
increasing a reward associated with the lure if the success is below a predetermined threshold.

2. The method of claim 1 wherein the virtual environment further comprises a plurality of virtual objects, and wherein presenting the influencing event configured to influence the control entity associated with the first virtual object to avoid the hotspot in the virtual environment comprises presenting an influencing event configured to influence a plurality of control entities respectively associated with the plurality of virtual objects to avoid the hotspot in the virtual environment.

3. The method of claim 1 wherein identifying the hotspot of virtual activity in the virtual environment comprises determining that a processor utilization of a processing device hosting the hotspot exceeds a predetermined processor utilization threshold.

4. The method of claim 1 wherein identifying a hotspot of virtual activity in the virtual environment comprises determining that a number of virtual objects present in the hotspot exceeds a predetermined threshold.

5. The method of claim 4 wherein the virtual objects comprise avatars.

6. The method of claim 1 wherein identifying the hotspot of activity in the virtual environment comprises determining that a number of messages generated by one or more virtual objects present in the hotspot exceeds a predetermined threshold.

7. The method of claim 1 wherein the hotspot comprises a region in the virtual environment provided by a host.

8. The method of claim 1 wherein the virtual environment is provided by a first host, further comprising requesting a second host that provides a region that is separate from a region provided by the first host to accept the control entity if the control entity is influenced to move the first virtual object to the region provided by the second host, and receiving an acknowledgement by the second host that the second host will accept the control entity if the control entity is influenced to move the first virtual object to the region provided by the second host.

9. The method of claim 1 wherein the control entity is a human.

10. The method of claim 1 wherein the control entity is a processing device.

11. A method for altering a virtual environment comprising:
- providing a virtual environment comprising a first virtual object;
- identifying a hotspot of virtual activity in the virtual environment;
- presenting an influencing event configured to influence a control entity associated with the first virtual object to avoid the hotspot in the virtual environment, wherein the influencing event comprises a repellant that includes a virtual force that inhibits movement of the first virtual object by the control entity in a direction toward the hotspot.

12. The method of claim 11 further comprising receiving feedback from the virtual environment regarding a movement of the first virtual object, and increasing the virtual force to further inhibit movement of the first virtual object by the control entity in the direction toward the hotspot.

13. An apparatus for altering a virtual environment comprising:
- a communications interface operative to communicate with a network; and
- a control system in communication with the communications interface and operative to:
  - provide a virtual environment comprising a first virtual object;
  - identify a hotspot of virtual activity in the virtual environment; and
  - present an influencing event configured to influence a control entity associated with the first virtual object to avoid the hotspot in the virtual environment, wherein the influencing event comprises a lure; and
  - receive feedback from the virtual environment regarding a success of the lure; and
  - increase a reward associated with the lure if the success is below a predetermined threshold.

14. An apparatus for displaying a virtual environment comprising:
- a communications interface operative to communicate with a network; and
- a control system in communication with the communications interface and operative to:
  - display a virtual environment comprising a first virtual object, the virtual environment comprising a hotspot of virtual activity; and
  - display an influencing event configured to influence a control entity associated with the first virtual object to avoid the hotspot in the virtual environment, wherein the influencing event comprises a repellant that includes a virtual force that inhibits movement of the first virtual object by the control entity in a direction toward the hotspot.

15. A method for altering a virtual environment comprising:
- providing a virtual environment comprising a first virtual object;
- identifying a hotspot of virtual activity in the virtual environment; and
- altering an attribute associated with the first virtual object to influence a control entity associated with the first virtual object to avoid the hotspot in the virtual environment, wherein the attribute comprises a virtual object template identifier identifying a level of attraction by the first virtual object to a second virtual object in the virtual environment.

* * * * *